US00RE47242E

(19) United States
(12) Reissued Patent
Park et al.

(10) Patent Number: US RE47,242 E
(45) Date of Reissued Patent: Feb. 12, 2019

(54) WIRELESS COMMUNICATION APPARATUS AND CONTROL METHOD THEREOF

(71) Applicant: SAMSUNG ELECTRONICS CO., LTD., Suwon-si (KR)

(72) Inventors: Si-hyun Park, Suwon-si (KR); Seung-seop Shim, Anyang-si (KR); Deok-nam Kim, Suwon-si (KR); Sang-u Shim, Hwaesong-si (KR); Yun-seoph Kim, Incheon (KR)

(73) Assignee: SAMSUNG ELECTRONICS CO., LTD., Suwon-si (KR)

(21) Appl. No.: 15/057,572

(22) Filed: Mar. 1, 2016

Related U.S. Patent Documents

Reissue of:
(64) Patent No.: 8,881,208
Issued: Nov. 4, 2014
Appl. No.: 13/353,709
Filed: Jan. 19, 2012

(30) Foreign Application Priority Data

Jun. 28, 2011 (KR) ..... 10-2011-0062582

(51) Int. Cl.
*G06F 3/12* (2006.01)
*G06F 21/60* (2013.01)
*G06F 21/62* (2013.01)
*H04L 29/06* (2006.01)

(52) U.S. Cl.
CPC ..... *H04L 63/10* (2013.01); *G06F 21/608* (2013.01); *G06F 21/6209* (2013.01); *G06F 3/1285* (2013.01); *G06F 2221/2147* (2013.01); *H04L 63/083* (2013.01)

(58) Field of Classification Search
CPC ..... H04N 21/43615; H04N 21/4104
USPC ..... 725/81; 713/168; 726/26; 358/1.15
See application file for complete search history.

(56) References Cited

U.S. PATENT DOCUMENTS 5,512,934 A * 4/1996 Kochanski ..... 725/97
6,931,659 B1 * 8/2005 Kinemura ..... 725/111
7,024,256 B2 * 4/2006 Krzyzanowski et al. ..... 700/65
(Continued)

FOREIGN PATENT DOCUMENTS

CN 1653816 A 8/2005
CN 101322342 A 12/2008
(Continued)

OTHER PUBLICATIONS

Communication dated Apr. 8, 2016 issued by European Patent Office in counterpart European Application No. 16153011.8.
(Continued)

*Primary Examiner* — Jalatee Worjloh
(74) *Attorney, Agent, or Firm* — Sughrue Mion, PLLC

(57) ABSTRACT

A wireless communication apparatus and a control method thereof are provided. The wireless communication apparatus includes: a first communication unit which receives a video signal from an image device; a video processor which processes the video signal; a second communication unit establishes a wireless connection with another device; and a controller receives wireless connection information from the image device through the first communication unit, and controls the second communication unit to establish the wireless connection with the other device based on the received wireless connection information.

36 Claims, 10 Drawing Sheets

(56) References Cited

U.S. PATENT DOCUMENTS

| | | | | |
|---|---|---|---|---|
| 7,298,726 | B2 * | 11/2007 | Zhang | H04W 76/11 370/338 |
| 8,365,232 | B2 * | 1/2013 | Funabiki | H04N 21/4341 370/328 |
| 8,565,135 | B2 * | 10/2013 | Husted | H04W 52/0229 370/311 |
| 9,693,384 | B2 * | 6/2017 | Jang | H04W 76/064 |
| 9,723,529 | B2 * | 8/2017 | Connors | H04W 36/14 |
| 2003/0142631 | A1 * | 7/2003 | Silvester | H04L 1/0001 370/252 |
| 2004/0163073 | A1 * | 8/2004 | Krzyzanowski et al. | 717/107 |
| 2005/0071441 | A1 | 3/2005 | Komatsuzaki et al. | |
| 2005/0278462 | A1 | 12/2005 | Gillespie | |
| 2006/0104238 | A1 | 5/2006 | Hibino | |
| 2007/0107020 | A1 | 5/2007 | Tavares | |
| 2007/0157285 | A1 | 7/2007 | Frank et al. | |
| 2008/0098464 | A1 * | 4/2008 | Mizrah | 726/5 |
| 2009/0260043 | A1 * | 10/2009 | Tatsuta et al. | 725/81 |
| 2009/0320077 | A1 * | 12/2009 | Gazdzinski | 725/62 |
| 2009/0323524 | A1 * | 12/2009 | Kuhn | 370/230 |
| 2010/0031299 | A1 * | 2/2010 | Harrang et al. | H04N 21/4104 725/80 |
| 2010/0070759 | A1 * | 3/2010 | Leon Cobos et al. | 713/155 |
| 2010/0076997 | A1 * | 3/2010 | Koike et al. | 707/772 |
| 2010/0121941 | A1 * | 5/2010 | Harrang et al. | 709/219 |
| 2010/0211785 | A1 * | 8/2010 | Park | H04L 29/1232 713/168 |
| 2010/0333148 | A1 * | 12/2010 | Musha et al. | 725/81 |
| 2011/0004909 | A1 * | 1/2011 | Ogi et al. | H04N 5/4403 725/81 |
| 2011/0050410 | A1 * | 3/2011 | Rezvani et al. | 340/506 |
| 2011/0130097 | A1 * | 6/2011 | Ejima | 455/41.2 |
| 2011/0179465 | A1 * | 7/2011 | Major et al. | 726/2 |
| 2011/0179468 | A1 * | 7/2011 | Adams et al. | 726/4 |
| 2011/0285917 | A1 | 11/2011 | Murase et al. | |
| 2011/0289537 | A1 * | 11/2011 | Buehl | 725/98 |
| 2011/0292835 | A1 * | 12/2011 | Zhu | H04W 28/18 370/255 |
| 2012/0166665 | A1 * | 6/2012 | Martin | 709/230 |
| 2013/0104183 | A1 * | 4/2013 | Ogaki et al. | 725/127 |

FOREIGN PATENT DOCUMENTS

| | | | |
|---|---|---|---|
| CN | 101873719 | A | 10/2010 |
| EP | 1441337 | A1 | 7/2004 |
| EP | 1443766 | A2 | 8/2004 |
| EP | 1770995 | A1 | 4/2007 |
| EP | 2 391 149 | A1 | 11/2011 |
| GB | 2377574 | A | 1/2003 |
| JP | 2008-17496 | A | 1/2008 |
| WO | 2011/040007 | A1 | 4/2011 |

OTHER PUBLICATIONS

Communication, Issued by the European Patent Office, dated Sep. 30, 2014, in counterpart European Application No. 12165936.1.

Office Action issued in parent U.S. Appl. No. 13/353,709 dated Dec. 31, 2012.

Office Action issued in parent U.S. Appl. No. 13/353,709 dated Jun. 5, 2013.

Office Action issued in parent U.S. Appl. No. 13/353,709 dated Dec. 26, 2013.

Notice of Allowance issued in parent U.S. Appl. No. 13/353,709 dated Jun. 30, 2014.

Communication dated Sep. 7, 2016, issued by the State Intellectual Property Office of P.R. China in counterpart Chinese Application No. 201210215594.9.

Communication dated Mar. 21, 2017, issued by the Korean Intellectual Property Office in counterpart Korean Application No. 10-2011-0062582.

Communication dated Sep. 17, 2012 issued by the European Patent Office in counterpart European Patent Application No. 12165936.1

* cited by examiner

WIRELESS COMMUNICATION APPARATUS AND CONTROL METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 8,881,208, which was filed as U.S. patent application Ser. No. 13/353,709 on Jan. 19, 2012 and issued on Nov. 4, 2014, the disclosure of which is hereby incorporated by reference in its entirety.*

CROSS-REFERENCE TO RELATED APPLICATION

This application claims priority from Korean Patent Application No. 10-2011-0062582, filed on Jun. 28, 2011 in the Korean Intellectual Property Office, the disclosure of which is incorporated herein by reference.

BACKGROUND

1. Field

Apparatuses and methods consistent with exemplary embodiments relate to a wireless communication apparatus and a control method thereof, and more particularly to a wireless communication apparatus connecting with at least one peripheral device and a control method thereof.

2. Description of the Related Art

An electronic device such as a television (TV), a monitor, a portable terminal, etc., displays an image based on a video signal. Such an electronic device may connect with at least one peripheral device. For example, the peripheral device may include a digital versatile disc (DVD) player, a BluRay disc (BD) player, a set-top box, a personal computer (PC), a camcorder, a portable terminal, etc.

Various connections are possible between the electronic device and the peripheral devices, and one of them is a connection using a wireless network (hereinafter, an electronic device connected through the wireless network will also be referred to as a "wireless communication apparatus"). Examples of a wireless network connection mode include an infrastructure mode, an ad-hoc mode, a Digital Living Network Alliance mode, etc.

However, the wireless network connection modes are regulated to connect the devices in accordance with their own characteristic procedures. It is therefore not only difficult for an unfamiliar user to connect the display device with the peripheral devices, but also inconvenient for a user to manually connect such devices via any given connection mode even if the user knows the connection mode.

SUMMARY

Exemplary embodiments address at least the above problems and/or disadvantages and other disadvantages not described above. However, an exemplary embodiments is not required to overcome the disadvantages described above, and an exemplary embodiment may not overcome any of the problems described above.

According to an aspect of an exemplary embodiment, there is provided a wireless communication apparatus which communicates with an image device, the apparatus including: a first communication unit which receives a video signal from the image device; a video processor which processes the video signal; a second communication unit establishes a wireless connection with another device; and a controller receives wireless connection information from the image device through the first communication unit, and controls the second communication unit to establish the wireless connection with the other device based on the received wireless connection information.

The other device may be the image device.

The wireless connection may include a connection with a wireless router.

The controller may determine a wireless connection mode based on the wireless connection information, and controls the second communication unit to establish the wireless connection with the other device based on the determined wireless connection mode.

The wireless connection mode may include one of an infrastructure mode, an ad-hoc mode, a wireless fidelity (Wi-Fi) direct mode, and a Digital Living Network Alliance (DLNA) mode.

The wireless connection information may include at least one of a device identification, a security key and a security type.

The controller may display a graphical user interface (GUI), which includes information for establishing the wireless connection on a display unit.

The wireless communication apparatus may further include a user input unit which receives a user's input, wherein the controller controls to establish the wireless connection in accordance with the received user's input.

The first communication unit may communicate based on a high-definition multimedia interface-consumer electronics control (HDMI-CEC) standard.

The first communication unit may communicate based on a universal serial bus (USB) standard.

The wireless communication apparatus may further include a display unit which displays an image based on the video signal processed by the video processor.

According to an aspect of an exemplary embodiment, there is provided a control method of a wireless communication apparatus that communicates with an image device and displays an image based on a video signal, the method including: receiving wireless connection information through a first communication unit configured to receive the video signal from the image device; and establishing a wireless connection through a second communication unit based on the received wireless connection information.

The establishing of the wireless connection may include establishing the wireless connection with the image device.

The establishing of the wireless connection may include establishing the wireless connection with a wireless router to which the image device is connected.

The establishing of the wireless connection may include determining a wireless connection mode based on the wireless connection information; and establishing the wireless connection via the determined wireless connection mode.

The wireless connection mode may include one of an infrastructure mode, an ad-hoc mode, a wireless fidelity (Wi-Fi) direct mode, and a Digital Living Network Alliance (DLNA) mode.

The wireless connection information may include at least one of a device identification, a security key and a security type.

The method may further include displaying a GUI, which includes information regarding establishing the wireless connection.

The method may further include receiving a user's input, wherein the establishing of the wireless connection comprises establishing the wireless connection in accordance with the received user's input.

The first communication unit may communicate based on an HDMI-CEC standard.

The first communication unit may communicate based on USB standard.

According to an aspect of an exemplary embodiment, there is provided a wireless communication apparatus which communicates with at least one image device, the apparatus including: a communication unit which receives a video signal from the at least one image device; a video processor which processes the video signal; and a controller which receives wireless connection information from the at least one image device through the communication unit, determines a wireless connection mode based on the received wireless connection information, and controls a wireless connection to be established based on the determined wireless connection mode.

Based on the wireless connection information received from a first image device from among the at least one image device, the controller may control the wireless connection to be established with a second image device from among the at least one image device.

According to an aspect of an exemplary embodiment, there is provided a control method of a wireless communication apparatus, the method including: receiving wireless connection information through a communication unit configured to receive a video signal from at least one image device; determining a wireless connection mode based on the received wireless connection information; and establishing a wireless connection via the determined wireless connection mode.

The establishing of the wireless connection may include establishing the wireless connection with a second image device from among the at least one image device based on the wireless connection information received from a first image device from among the at least one image device.

The image device may include one of a digital versatile disc (DVD) player, a BluRay disc (BD) player, a set-top box, a personal computer, a camcorder and a portable terminal.

The wireless connection may include a connection with a wireless router.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
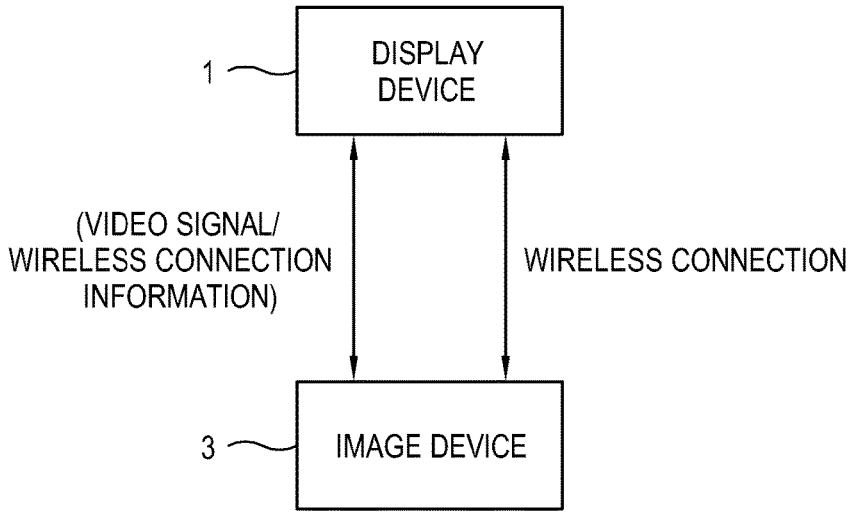
FIGS. 1 and 2 show a display device according to exemplary embodiments.
Figure 2:
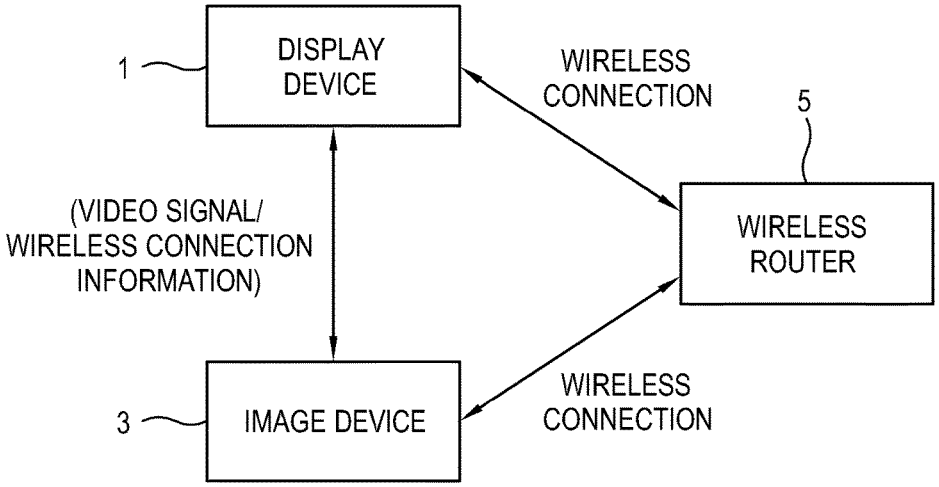

Below, exemplary embodiments will be described in detail. FIGS. 1 and 2 show a display device according to an exemplary embodiment. The display device 1 may be achieved by a television (TV), a monitor, a portable terminal, etc., but not limited thereto. The display device 1 may include any device which can display an image based on a video signal. The display device 1 is an example of a wireless communication apparatus.

The display device 1 connects with the peripheral device such as an image device 3. The image device 3 may include a digital versatile disc (DVD) player, a BluRay disc (BD) player, a set-top box, a personal computer (PC), a camcorder, a portable terminal, etc. The peripheral device connected to the display device 1 is not limited to the image device 3. Also, the number of image devices 3 connected to the display device 1 is not limited to one device. Two or more image devices may be connected to the display device 1.

The display device 1 and the image device 3 may form a wireless network (hereinafter, referred to as "wireless connection"). As an example of a wireless network connection mode (hereinafter, referred to as a "wireless connection mode") in this exemplary embodiment, there are an infrastructure mode, an ad-hoc mode, a DLNA mode, etc. Through this wireless connection mode, the display device 1 and the image device 3 may connect with each other directly as shown in FIG. 1, for example, or through a wireless router 5 as shown in another example as in FIG. 2.

The display device 1 and the image device 3 may connect with each other not only wirelessly, but also through a predetermined interface for transmitting a video signal and/or an audio signal (hereinafter, referred to as a "video signal"). In this exemplary embodiment, an interface mode between the display device 1 and the image device 3 may include high-definition multimedia interface (HDMI) or an HDMI-consumer electronics control (CEC).

The display device 1 receives information for a wireless connection (hereinafter, referred to as "wireless connection information") from the image device 3 through the interface for transmitting a video signal, and performs the wireless connection based on the received wireless connection information. For example, the wireless connection of an exemplary embodiment includes connection between the display device 1 and the image device 3 or connection between the display device 1 and the wireless router 3 as described above. The wireless connection information in this exemplary embodiment corresponds to each foregoing wireless connection mode, and contains information needed for a wireless connection in accordance with procedures regulated by these modes. For example, the wireless connection information may include information about at least one of whether the image device 3 is mounted with a wireless adapter, a supportable wireless connection mode (i.e., whether the image device 3 supports the ad-hoc mode), and a current network configuration state (i.e., whether the image device 3 connects with a wireless router, a DLNA server or the like). For example, the wireless connection information may also contain at least one of device identification (ID) of the image device 3, a security key and a security type.

Figure 3:
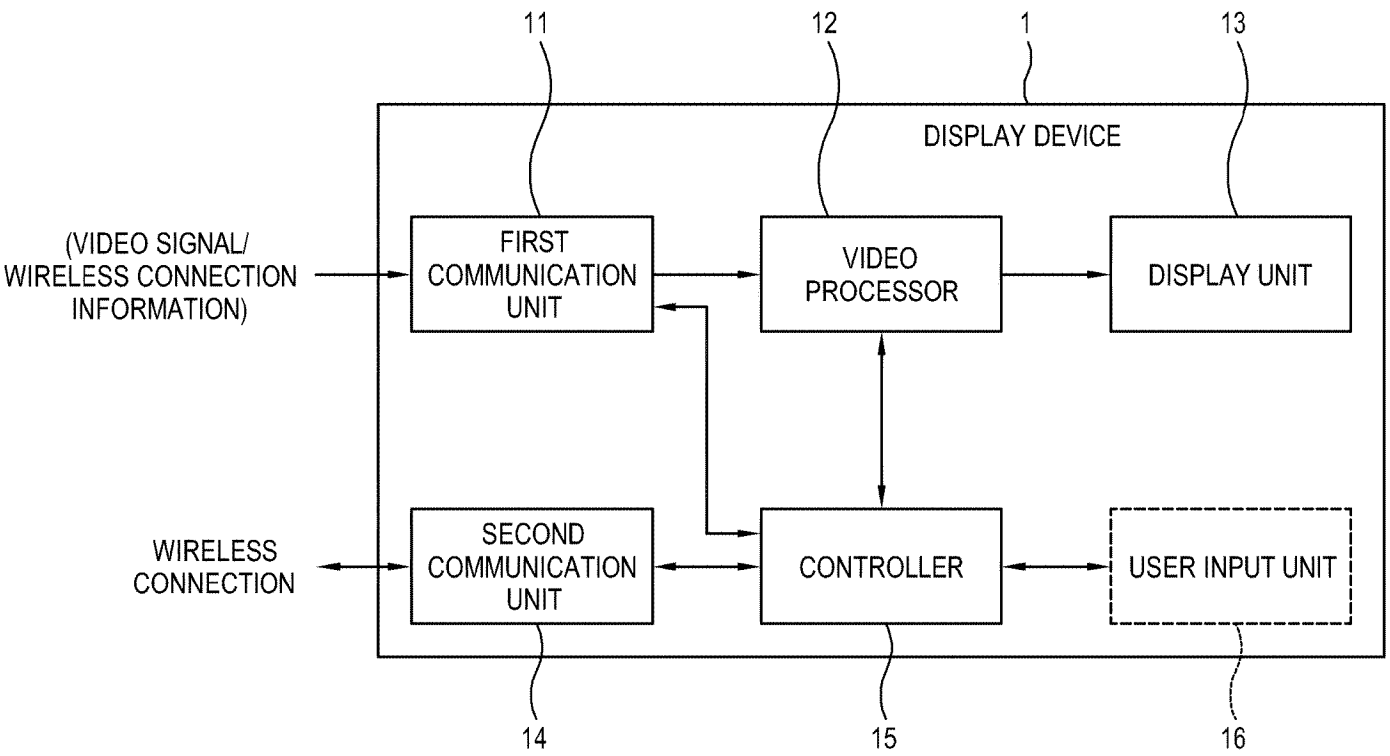
FIG. 3 is a block diagram showing the display device, examples of which are shown in FIGS. 1 and 2.

FIG. 3 is a block diagram showing the display device 1 shown in FIGS. 1 and 2. As shown therein, the display device 1 includes a first communication unit 11, a video processor 12, a display unit 13, a second communication unit 14, and a controller 15. The term "unit" as used herein means a hardware component, such as a processor or circuit, and/or a software component that is executed by a hardware component such as a processor.

The first communication unit 11 communicates with the image device 3 through an interface for transmitting a video signal. The first communication unit 11 receives wireless connection information from the image device 3.

The video processor 12 performs video processing for displaying an image based on a video signal received through the first communication unit 11. The video processor 12 may perform decoding, scaling, image enhancing, etc.

The display unit 13 displays an image based on a video signal processed by the video processor 12. For example, the display unit 13 may display an image by at least one type among various display types such as a liquid crystal display (LCD), a plasma display panel (PDP), projection, an organic light emitting diode (OLED), etc.

The second communication unit 14 performs wireless communication for a wireless network connection. The second communication unit 14 corresponds to each wireless connection mode, and performs operations needed for a wireless connection in accordance with procedures regulated by these modes. The second communication unit 14 performs communication for a wireless connection based on the wireless connection information received from the image device 3 under control of the controller 15.

The controller 15 generally controls the display device 1. The controller 15 controls the first communication unit 11, the video processor 12 and the display unit 13 to display an image based on a video signal.

The controller 15 receives wireless connection information from the image device 3 through the first communication unit 11, and controls the second communication unit 14 to perform wireless connection based on the received wireless connection information. The controller 15 may include a non-volatile memory (not shown) where a control program for performing the above control is stored, a volatile memory (not shown) where the control program is at least partially loaded, and a microprocessor (not shown) that executes the loaded program.

Figure 4:
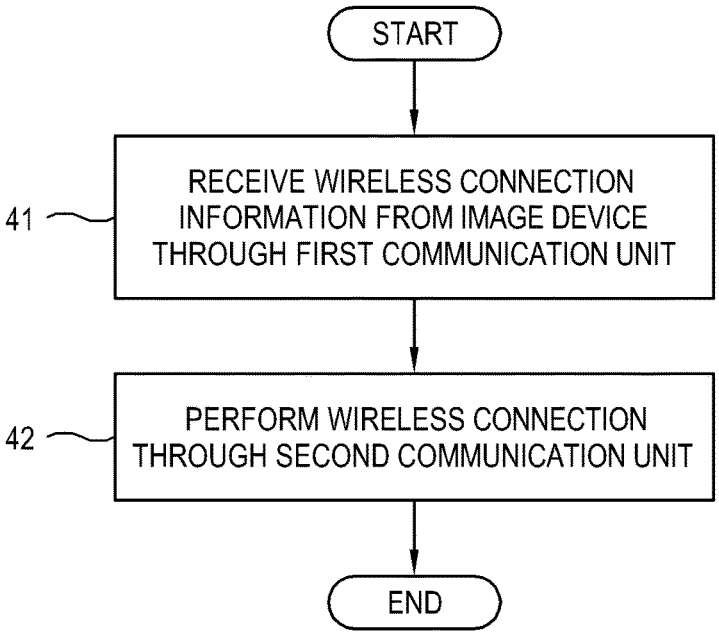
FIG. 4 is a flowchart showing operations of the display device, examples of which are shown in FIGS. 1 to 3.

FIG. 4 is a flowchart showing operations of the display device 1 shown in FIGS. 1 to 3. For convenience of description, suppose that the display device 1 is not connected to a wireless network yet.

First, at operation 41, the display device 1 receives wireless connection information from the image device 3 through the first communication unit 11. For example, if the display device 1 connects with the image device 3 through an HDMI cable, the display device 1 performs a discovery algorithm through the HDMI-CEC and receives the wireless connection information from the image device 3.

Then, at operation 42, the display device 1 performs wireless connection through the second communication unit 14 on the basis of the wireless connection information received from the image device 3 through the first communication unit 11.

In the case of a wireless fidelity (Wi-Fi) direct connection as an example of the above-mentioned wireless connection modes, the display device 1 sends the image device 3 a command of request for the Wi-Fi direct connection, and the image device 3 receiving the command enters a group formation procedure. Also, the display device 1 outputting the command starts the group formation procedure for the Wi-Fi direct connection. When the group formation procedure is completed, the Wi-Fi direction connection between the display device 1 and the image device 3 is automatically achieved through a provisioning procedure; in which the display device 1 and the image device 3 exchange a Wi-Fi credential with each other through Wi-Fi simple config (WSC) and achieve Wi-Fi connection. The procedure of establishing a wireless connection is not limited to the above exemplary embodiment, and may be carried out variously in accordance with each of the wireless connection modes mentioned above.

Figure 5:
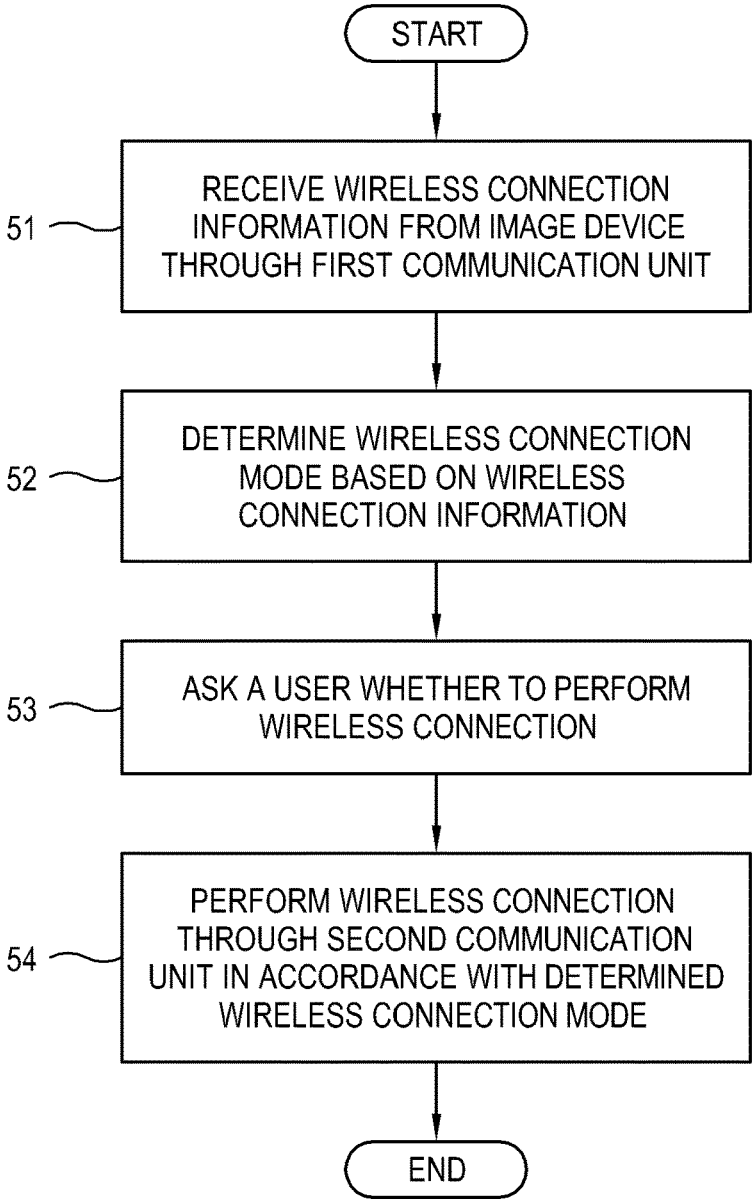
FIG. 5 is a flowchart showing another example of the operations of the display device, examples of which are shown in FIGS. 1 to 3.

FIG. 5 is a flowchart showing another example of the operations of the display device 1 shown FIGS. 1 to 3.

First, at operation 51, the display device 1 receives wireless connection information from the image device 3 through the first communication unit 11.

Then, at operation 52, the display device 1 determines a wireless connection mode to be performed through the second communication unit 14 based on the wireless connection information received from the image device 3 through the first communication unit 11. That is, the display device 1 analyzes the received wireless connection information, and grasps a current wireless network state, thereby determining a proper wireless connection mode. For example, the determined wireless connection mode may be one of the infrastructure mode, the ad-hoc mode, the Wi-Fi direct connection mode, the DLNA mode, etc. as described above. Further, if the image device 3 is connected to the wireless router 5 but the display device 1 is not connected to the wireless router 5, it may be determined to connect the display device 1 and the wireless router 5 to achieve the infrastructure mode. However, this is merely an example. Alternatively, the determination of the wireless connection mode based on the wireless connection information may be varied depending on the current wireless network state.

Figure 6:
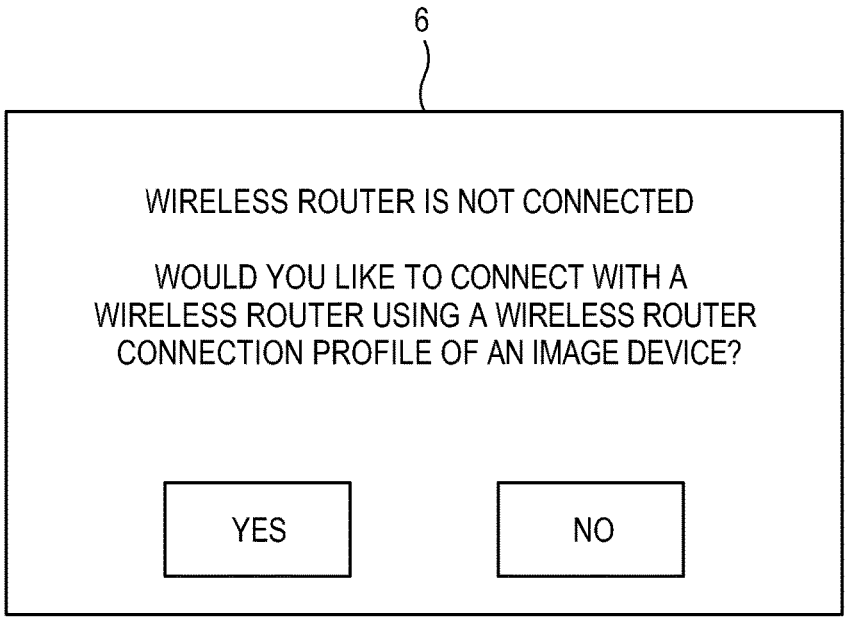
FIG. 6 shows a GUI for ascertaining whether wireless connection is succeeded according to an exemplary embodiment.

Next, at operation 53, the display device 1 asks a user whether to carry out the wireless connection based on the determined wireless connection mode. In this case, as shown in FIG. 6, the display device 1 may display a graphic user interface 6, which includes information for allowing a user to confirm whether to carry out the wireless connection, on the display unit 13. As shown in FIG. 3, the display device 1 may further include a user input unit 16 for receiving a user's input about whether to carry out the wireless connection.

Referring back to FIG. 5, at operation 54, if there is a user's confirmation, the display device 1 performs the wireless communication based on the determined wireless connection mode through the second communication unit 14.

Thus, in the display device 1 according to an exemplary embodiment, the wireless connection is automatically established based on the wireless connection information received from the image device 3, thereby improving a user's convenience. That is, a user can establish the wireless network between the devices even though she has no prior knowledge about the network or the devices. It is therefore more convenient, and time taken during the wireless connection procedures may be reduced.

Figure 7:
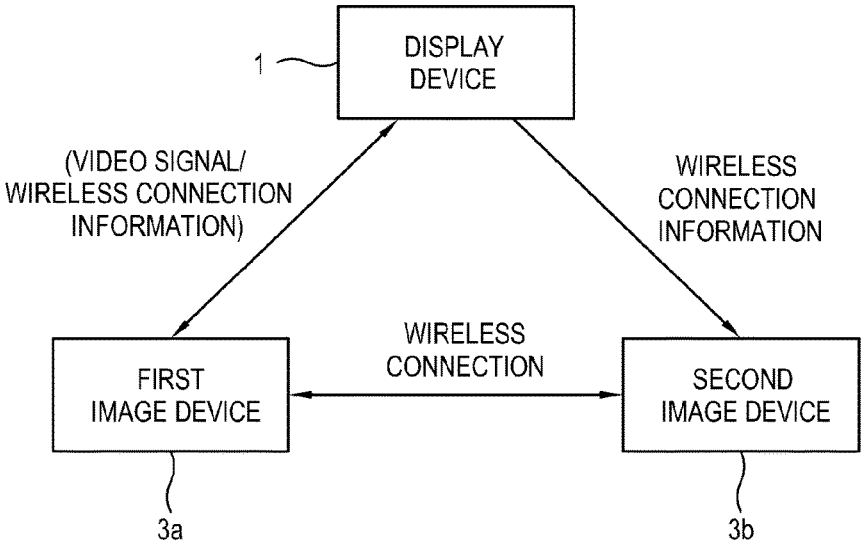
FIGS. 7 and 8 show a display device according to another exemplary embodiment.
Figure 8:
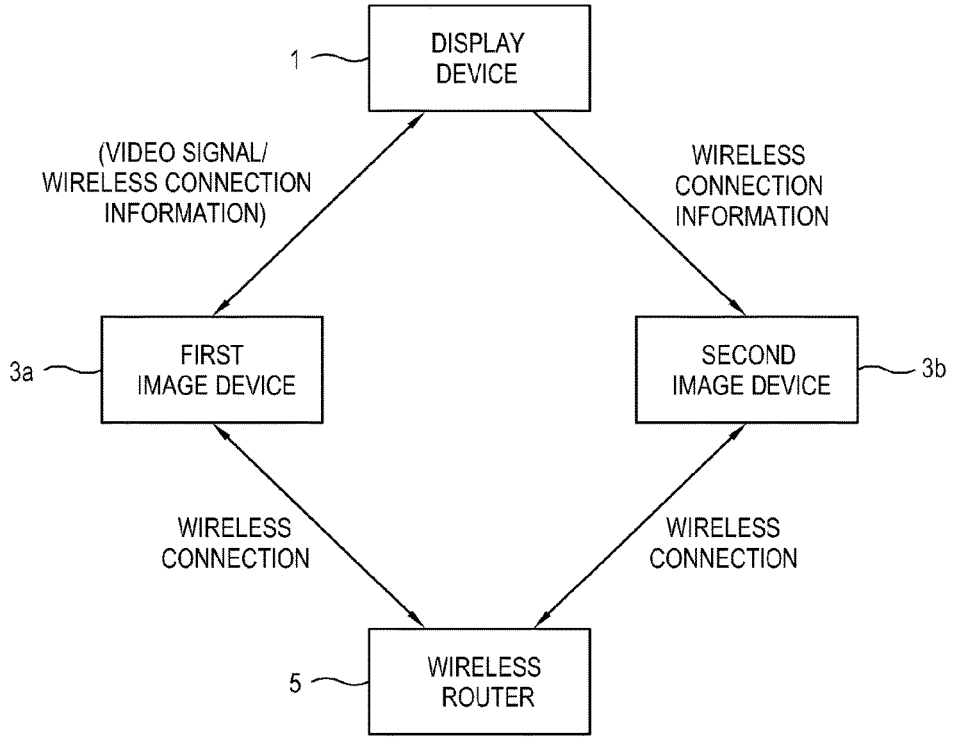

FIGS. 7 and 8 show a display device according to another exemplary embodiment. Regarding the display device 1 shown in FIGS. 7 and 8, repetitive descriptions to the display device 1 shown in FIGS. 1 to 6 will be avoided.

The display device 1 connects with a plurality of image devices 3a and 3b through an interface for transmitting a video signal. The plurality of image devices 3a and 3b may wirelessly connect with each other. The display device 1 receives wireless connection information from one (e.g., image device 3a) of the plurality of image devices 3a and 3b, and transmits it to the other one (e.g., image device 3b), thereby establishing the wireless connection of the image device 3b.

For example, the image device 3b and the image device 3a may be connected in the ad-hoc mode as shown in FIG. 7, or through the wireless router 5 in the infrastructure mode as shown in FIG. 8. Of course, this is merely an example. Alternatively, the image device 3b and the image device 3a may be connected in another wireless connection mode such as an ad-hoc mode of the Wi-Fi direct standards, the DLNA mode, etc.

Figure 9:
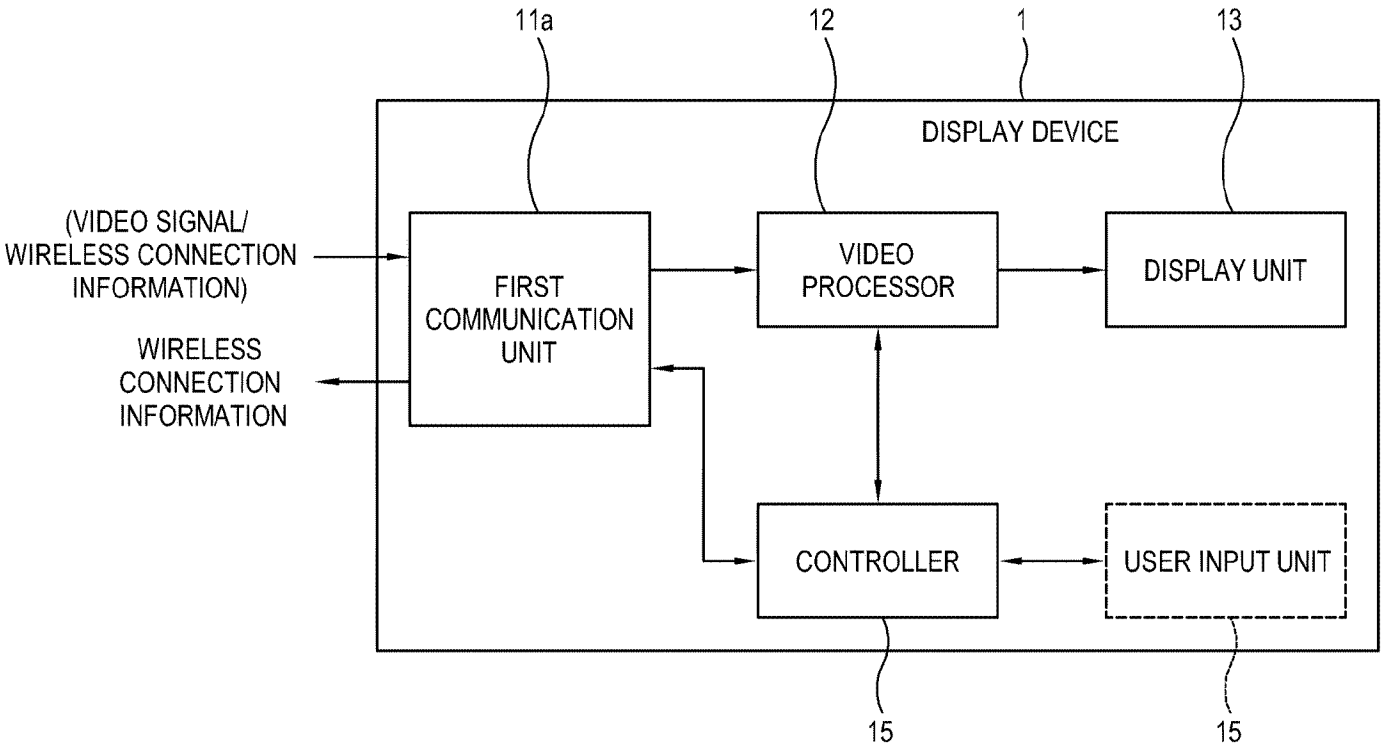
FIG. 9 is a block diagram showing the display device, examples of which are shown in FIGS. 7 and 8.

FIG. 9 is a block diagram showing the display device shown in FIGS. 7 and 8. As shown in FIG. 9, the display device 1 includes a communication unit 11a, an video processor 12, a display unit 13 and a controller 15. The communication unit 11a communicates with a plurality of image devices 3a and 3b through an interface for transmitting a video signal. The communication unit 11a receives wireless connection information from one 3a among the plurality of image devices 3a and 3b under control of the controller 15, and transmits it to the other one 3b. The controller 15 receives the wireless connection information from the image device 3a through the communication unit 11a, and transmits the received wireless connection information to the image device 3b, thereby controlling the wireless connection for the image device 3b to be established.

Figure 10:
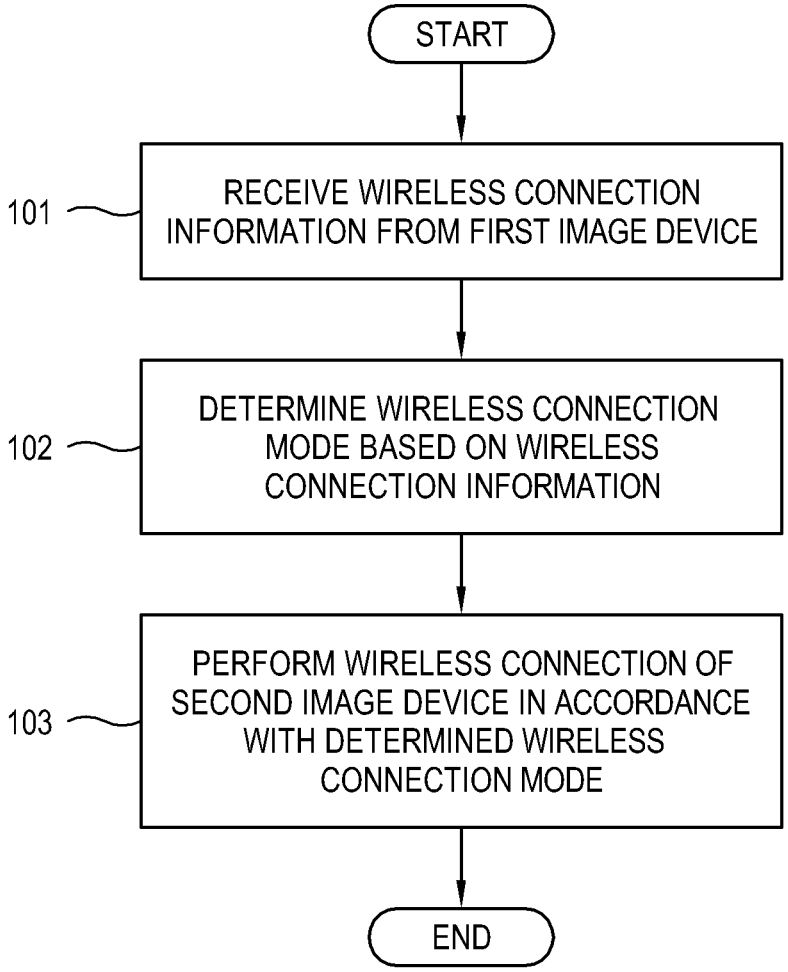
FIG. 10 is a flowchart showing operations of the display device, examples of which are shown in FIGS. 7 to 9.

FIG. 10 is a flowchart showing operations of the display device 1 shown in FIGS. 7 to 9. First, at operation 101, the display device 1 requests the image device 3a to send the wireless connection information through the communication unit 11a, and thus receives the wireless connection information from the image device 3a.

Then, at operation 102, the display device 1 determines a wireless connection mode to be established for the image device 3b on the basis of the wireless connection information received from the image device 3a through the communication unit 11a.

Next, at operation 103, the display device 1 carries out the wireless connection of the image device 3b in accordance with the determined wireless connection mode. That is, the display device 1 transmits the wireless connection information received from the image device 3a to the image device 3b. The image device 3b performs the wireless connection based on the received wireless connection information.

As described above, it may be possible to more easily perform the wireless network connection with at least one peripheral device.

Also, the wireless network connection is performed by receiving the wireless network information from the device connected through the HDMI-CED for transmitting a video signal, the USB for universal communication, etc., and therefore there is no need of a separate configuration for an automatic wireless connection, thereby simplifying configuration and reducing cost.

Although a few exemplary embodiments have been shown and described, it will be appreciated by those skilled in the art that changes may be made in these exemplary embodiments without departing from the principles and spirit of the present inventive concept.

For example, if the plural image devices are connected to the wireless router 5, and are capable of sharing content through the DLNA mode on the basis of the received wireless connection information, the display device 1 asks a user whether to activate a DLNA connection between the devices and allows content to be automatically shared between the devices. In this case, the display device 1 sends a message for driving a DLNA server to the image device providing content, so that the display device 1 can become a DLNA client. Also, such share of the content may be achieved in another wireless connection mode such as the ad-hoc mode or the like.

Also, the display device may connect with a peripheral device by a universal communication standard such as a USB standard or the like, as well as the HDMI-CEC standard for transmitting the video signal according to the foregoing exemplary embodiment, so that it can receive information for the wireless network connection through the universal communication standard.

Further, the foregoing exemplary embodiment illustrates only the display device 1 as a wireless communication device, but is not limited thereto. Alternatively, the foregoing exemplary embodiments may be applied to any electronic device having a wireless communication function.

What is claimed is:

1. A wireless communication apparatus [which communicates] *configured to communicate* with an image device, the *wireless communication* apparatus comprising:

a first communication unit which has a wired connection with the image device [and receives], *the first communication unit configured to receive* a video signal and wireless connection information from the image device, *wherein the first communication unit is implemented by a first hardware circuit*;

a video processor [which processes] *configured to process* the video signal;

a second communication unit [which wirelessly communicates] *configured to wirelessly communicate* with another device, *wherein the second communication unit is implemented by a second hardware circuit*; and a controller [controls] *configured to control* the second communication unit to communicate with the another device to establish a wireless connection *of at least two from* among [at least two of] the wireless communication apparatus, the image device and the another device based on the received wireless connection information through the first communication unit, *wherein the controller comprises a microprocessor,* wherein the controller [determines] *is further configured to determine* a wireless connection mode based on the wireless connection information according to a current wireless network state, and [controls] *to control* the second communication unit to communicate with the another device to establish the wireless connection based on the determined wireless connection mode.

2. The wireless communication apparatus according to claim 1, wherein the another device is the image device.

3. The wireless communication apparatus according to claim 1, wherein the wireless connection comprises a connection with a wireless router.

4. The wireless communication apparatus according to claim 1, wherein the wireless connection mode comprises one of an infrastructure mode, an ad-hoc mode, a wireless fidelity (Wi-Fi) direct mode, and a Digital Living Network Alliance (DLNA) mode.

5. The wireless communication apparatus according to claim 1, wherein the wireless connection information comprises at least one of a device identification, a security key and a security type.

6. The wireless communication apparatus according to claim 1, wherein the controller [displays] *is configured to display* a graphical user interface (GUI), which includes information for establishing the wireless connection on a display [unit].

7. The wireless communication apparatus according to claim 1, further comprising a user input unit which receives a user's input, wherein the controller [controls] *is configured* to establish the wireless connection in accordance with the received user's input.

8. The wireless communication apparatus according to claim 1, wherein the first communication unit [communicates] *is configured to communicate* based on a high-definition multimedia interface-consumer electronics control (HDMI-CEC) standard.

9. The wireless communication apparatus according to claim 1, wherein the first communication unit [communicates] *is configured to communicate* based on a universal serial bus (USB) standard.

10. The wireless communication apparatus according to claim 1, further comprising a display [unit] which [displays] *is configured to display* an image based on the video signal processed by the video processor.

11. A control method of a wireless communication apparatus that communicates with an image device and displays an image based on a video signal, the method comprising:

receiving wireless connection information and the video signal through a first communication unit configured to have a wired connection with the image device from the image device;

communicating with another device through a second communication unit configured to have a wireless connection with the another device to establish a wireless connection *of at least two from* among [at least two of] the wireless communication apparatus, the image device and the another device based on the received wireless connection information through the first communication unit;

determining a wireless connection mode based on the wireless connection information according to a current wireless network state; and establishing the wireless connection through the second communication unit based on the determined wireless connection mode.

12. The method according to claim 11, wherein the establishing of the wireless connection comprises establishing the wireless connection with the image device.

13. The method according to claim 11, wherein the establishing of the wireless connection comprises establishing the wireless connection with a wireless router to which the image device is connected.

14. The method according to claim 11, wherein the wireless connection mode comprises one of an infrastructure mode, an ad-hoc mode, a wireless fidelity (Wi-Fi) direct mode, and a Digital Living Network Alliance (DLNA) mode.

15. The method according to claim 11, wherein the wireless connection information comprises at least one of a device identification, a security key and a security type.

16. The method according to claim 11, further comprising displaying a graphical user interface (GUI), which includes information regarding establishing the wireless connection.

17. The method according to claim 11, further comprising receiving a user's input, wherein the establishing of the wireless connection comprises establishing the wireless connection in accordance with the received user's input.

18. The method according to claim 11, wherein *the receiving comprises receiving through* the first communication unit [communicates] based on a high-definition multimedia interface-consumer electronics control (HDMI-CEC) standard.

19. The method according to claim 11, wherein *the receiving comprises receiving through* the first communication unit [communicates] based on universal serial bus (USB) standard.

20. A wireless communication apparatus [which communicates] *configured to communicate* with at least one image device, the *wireless communication* apparatus comprising:

a *first* communication unit [which has] *implemented by a first hardware circuit configured to have* a wired connection with the at least one image device and [receives] *to receive* a video signal and wireless connection information from the at least one image device;

*a second communication unit implemented by a second hardware circuit configured to have a wireless communication;* a video processor [which processes] *configured to process* the video signal; and a controller [determines] *configured to determine* a wireless connection mode based on the [received] wireless connection information *received through the first communication unit*, and [controls a] *to control the second communication unit to establish the* wireless connection [to be established] based on the determined wireless connection mode*, wherein the controller comprises a microprocessor*.

21. The wireless communication apparatus according to claim 20, wherein, based on the wireless connection information received from a first image device from among the at least one image device, the controller [controls] *is configured to control the second communication unit to establish* the wireless connection [to be established] with a second image device from among the at least one image device.

22. A control method of a wireless communication apparatus *configured to communicate with at least one image device*, the method comprising:

receiving wireless connection information and a video signal *from the at least one image device* through a *first* communication unit *implemented by a first hardware circuit* configured to have a wired connection with *the* at least one image device [and receive the video signal from the at least one image device];

determining a wireless connection mode based on the [received] wireless connection information *received through the first communication unit*; and establishing a wireless connection [via] *based on* the determined wireless connection mode *through a second communication unit implemented by a second hardware circuit configured to have the wireless communication*.

23. The method according to claim 22, wherein the establishing of the wireless connection comprises establishing the wireless connection with a second image device from among the at least one image device based on the wireless connection information received from a first image device from among the at least one image device.

24. The wireless communication apparatus according to claim 1, wherein the image device includes one of a digital versatile disc (DVD) player, a BluRay disc (BD) player, a set-top box, a personal computer, a camcorder and a portable terminal.

25. The wireless communication apparatus according to claim 24, wherein the wireless connection comprises a connection with a wireless router.

26. A wireless communication apparatus comprising:

a [communication unit] *first hardware communication circuit* configured to communicate with a first device connected with a second device;

*a second hardware communication circuit configured to communicate wirelessly; and* a controller *implemented by a processor* configured to receive, from the [second] *first* device, information for wireless communication with the second device in a predetermined wireless communication mode *through the first hardware communication circuit* and to control the [communication unit] *second hardware communication circuit* to establish [the] *a* wireless connection with the second device based on the [received] information for wireless communication *received* from the first device *through the first hardware communication circuit*.

27. The wireless communication apparatus according to claim 26, wherein [the communication unit comprises]:

[a first communication unit] *the first hardware communication circuit is* configured to have a wired connection and communicate with the first device; and

[a second communication unit] *the second hardware communication circuit is* configured to wirelessly communicate with the second device.

28. The wireless communication apparatus according to claim 26, wherein the [communication unit receives] *first hardware communication circuit is configured to receive* state information on the second device from the first device, the state information comprises information on whether to wirelessly communicate with the second device, and the controller [controls] *is further configured to control* the [communication unit] *second hardware communication circuit* to establish the wireless connection with the second device based on the state information.

29. The wireless communication apparatus according to claim 28, wherein the predetermined wireless communication mode comprises a wireless fidelity (Wi-Fi) direct mode.

*30. A wireless communication apparatus comprising:*

*a first hardware communication circuit configured to communicate with a first device connected with a second device and to receive from the first device wireless connection information for wireless communication with the second device;*

*a second hardware communication circuit configured to communicate wirelessly; and*

*a controller implemented by a processor configured to determine a wireless communication mode from among a plurality of wireless communication modes of the wireless communication apparatus based on the wireless connection information and to control the second hardware communication circuit to establish a wireless connection with the second device in the determined wireless communication mode based on the received wireless connection information for wireless communication from the first device.*

*31. The wireless communication apparatus according to claim 30, wherein the first hardware communication circuit is configured to have a wired connection and communicate with the first device, and*

*the second hardware communication circuit is configured to wirelessly communicate with the second device.*

*32. The wireless communication apparatus according to claim 30, wherein the first hardware communication circuit is configured to receive state information on the second device from the first device, and*

*the controller is further configured to control the second hardware communication circuit to establish the wireless connection with the second device based on the state information.*

*33. The wireless communication apparatus according to claim 32, wherein the determined wireless communication mode comprises a wireless fidelity (Wi-Fi) direct mode, and*

*the wireless connection information received from the first device comprises information for the wireless connection with the second device in the wireless fidelity (Wi-Fi) direct mode.*

*34. The wireless communication apparatus according to claim 30, wherein the determined wireless communication mode comprises a wireless fidelity (Wi-Fi) direct mode, and*

*the wireless connection information received from the first device comprises information for the wireless connection with the second device in the wireless fidelity (Wi-Fi) direct mode.*

*35. The wireless communication apparatus according to claim 20, wherein the controller is configured to determine the wireless connection mode according to a current wireless network state.*

*36. The method according to claim 22, wherein the determining the wireless connection mode comprises determining the wireless connection mode according to a current wireless network state.*

* * * * *